US008446827B2

(12) United States Patent
Kitahara et al.

(10) Patent No.: US 8,446,827 B2
(45) Date of Patent: May 21, 2013

(54) RADIO COMMUNICATION TERMINAL

(75) Inventors: Takeshi Kitahara, Fujimino (JP);
Hajime Nakamura, Fujimino (JP);
Yasuhiko Hiehata, Fujimino (JP)

(73) Assignee: KDDI Corporation, Tokyo (JP)

( * ) Notice: Subject to any disclaimer, the term of this patent is extended or adjusted under 35 U.S.C. 154(b) by 473 days.

(21) Appl. No.: 12/728,702

(22) Filed: Mar. 22, 2010

(65) Prior Publication Data
US 2010/0238861 A1 Sep. 23, 2010

(30) Foreign Application Priority Data

Mar. 23, 2009 (JP) .............................. P2009-070456

(51) Int. Cl.
*H04L 12/26* (2006.01)
*H04W 72/06* (2009.01)

(52) U.S. Cl.
USPC ........... 370/232; 370/235; 370/252; 370/329; 370/337; 455/67.11; 455/450

(58) Field of Classification Search
USPC ................. 370/328, 338, 252, 235, 229–234, 370/329–330, 336–337, 468; 455/67.11, 455/67.13, 450, 452.1, 452.2
See application file for complete search history.

(56) References Cited

U.S. PATENT DOCUMENTS

| 6,118,834 | A  * | 9/2000  | Rasanen ....................... 375/372 |
| 6,469,991 | B1 * | 10/2002 | Chuah ........................... 370/329 |
| 7,433,309 | B2 * | 10/2008 | Rue .............................. 370/232 |
| 7,978,607 | B1 * | 7/2011  | Halabi et al. ................. 370/235 |
| 8,121,536 | B2 * | 2/2012  | Schiff et al. ................... 455/12.1 |
| 2002/0107021 | A1 * | 8/2002  | Ishikawa et al. .............. 455/436 |
| 2002/0161913 | A1 * | 10/2002 | Gonzalez et al. ............. 709/233 |
| 2003/0123425 | A1 * | 7/2003  | Walton et al. ................. 370/341 |
| 2004/0029536 | A1 * | 2/2004  | Hamatsu et al. ................ 455/95 |

(Continued)

FOREIGN PATENT DOCUMENTS

| JP | 2000-115839 A | 4/2000 |
| JP | 2003-169363   | 6/2003 |

(Continued)

OTHER PUBLICATIONS

Wireless LAN Medium Access Control (MAC) Physical Layer (PHY) Specifications Amendment 8: Medium Access Control (MAC) Quality of Service Enhancements.

(Continued)

*Primary Examiner* — Kwang B Yao
*Assistant Examiner* — Candal Elpenord
(74) *Attorney, Agent, or Firm* — Morgan, Lewis & Bockius LLP

(57) ABSTRACT

A radio communication terminal includes a link-usage level calculating section that calculates usage level of a radio link, and a data reception continuation/suspension determining section that determines continuation of data reception or suspension of data reception according to the level of usage calculated by the link-usage level calculating section. The link-usage level calculating section calculates a current usage level indicating a level of usage of the radio link associated with current data reception in the radio communication terminal. The data reception continuation/suspension determining section determines continuation of data reception when the current usage level is equal to or higher than a reference level of usage being a threshold and determines suspension of data reception when the current usage level is lower than the reference level of usage.

14 Claims, 6 Drawing Sheets

U.S. PATENT DOCUMENTS

| | | | |
|---|---|---|---|
| 2004/0054650 A1* | 3/2004 | Chun | 707/1 |
| 2004/0068570 A1* | 4/2004 | Haller | 709/228 |
| 2006/0187905 A1* | 8/2006 | Manabe | 370/352 |
| 2007/0274288 A1* | 11/2007 | Smith et al. | 370/351 |
| 2008/0285496 A1* | 11/2008 | Fuchs et al. | 370/311 |
| 2010/0144326 A1* | 6/2010 | Wilhelmsson | 455/414.1 |

FOREIGN PATENT DOCUMENTS

| | | |
|---|---|---|
| JP | 2006-140845 A | 6/2006 |
| JP | 2008-227721 A | 9/2008 |
| WO | 2008/053841 A1 | 5/2008 |

OTHER PUBLICATIONS

Notice of Reason for Rejection for JP 2009-070456, issued Oct. 23, 2012.

* cited by examiner

RADIO COMMUNICATION TERMINAL

BACKGROUND OF THE INVENTION

1. Field of the Invention

The present invention relates to a radio communication terminal.

Priority is claimed on Japanese Patent Application No. 2009-070456 filed on Mar. 23, 2009, the contents of which are incorporated herein by reference.

2. Description of the Related Art

Currently, various types of data traffic (for example, data traffic by web browsing, streaming video, electronic mail, and transfer of huge files) are generated from radio data communication terminals. There exist some techniques focusing on effective handling of real-time data traffic, in which a high priority is set to data traffic requiring high real-time performance to allocate radio resources (time, frequency, and power) preferentially.

In these techniques, low priority is also allocated to data traffic which do not require real-time performance at all, generated by a radio data communication terminal. Accordingly, the radio resources are also used with respect to this kind of non-real-time data traffic which don't require any real-timeliness (for example, refer to Japanese Unexamined Patent Application, First Publication No. 2003-169363, "Wireless LAN Medium Access Control (MAC) and Physical Layer (PHY) Specifications Amendment 8: Medium Access Control (MAC) Quality of Service Enhancements", IEEE Std. 802.11e, 2005).

However, the technique for allocating the radio resources by setting a priority, allocates the radio resources even to data traffic which does not require real-time performance at all, even under a state in which a network has congestion. Therefore, from a standpoint of an operator (common carrier) who operates a radio access network, it is not desirable to accommodate data traffic which does not require real-time performance at all at the time of congestion, because of consuming radio resource, which is desired to be allocated to other data traffic which requires real-time performance. Moreover, even from a standpoint of a user of the radio access network, it's not a big issue to take quite long time to complete to download if the user (and the application used by the user) does not require real-time performance at all and the price of the download is cheaper than ordinary condition. For example, if "download thereof needs to be complete sometime" and that download price is quite cheap, the user might not care about how much time the download takes.

SUMMARY OF THE INVENTION

In view of the above situation, an object of the present invention is to provide a technique for using radio resources reasonably.

A radio communication terminal according to a first aspect of the present invention includes: a link-usage level calculating section that calculates usage level of a radio link, the link-usage level calculating section calculating a current usage level indicating a level of usage of the radio link associated with current data reception in the radio communication terminal; and a data reception continuation/suspension determining section that determines continuation of data reception or suspension of data reception according to the level of usage calculated by the link-usage level calculating section, the data reception continuation/suspension determining section determining continuation of data reception when the current usage level is equal to or higher than a reference level of usage being a threshold and determining suspension of data reception when the current usage level is lower than the reference level of usage.

A radio communication terminal according to a second aspect of the present invention includes: a link-usage level calculating section that calculates usage level of a radio link, the link-usage level calculating section calculating a current usage level indicating a level of usage of the radio link associated with current data reception in the radio communication terminal, the link-usage level calculating section calculating a current-time-zone level of usage indicating a level of usage of the radio link in the current time zone associated with data reception in the radio communication terminal based on the current usage level and another level of usage calculated in the current time zone, when the current usage level is calculated; and a data reception continuation/suspension determining section that determines continuation of data reception or suspension of data reception according to the level of usage calculated by the link-usage level calculating section, the data reception continuation/suspension determining section determining continuation of data reception when the current-time-zone level of usage is equal to or higher than a reference level of usage being a threshold, and determining suspension of data reception when the current-time-zone level of usage is lower than the reference level of usage.

The radio communication terminal may further include a threshold calculating section that calculates the reference level of usage based on an off-time level of usage indicating a level of usage of the radio link associated with data reception in the radio communication terminal during off time of the radio link, the link-usage level calculating section calculating the off-time level of usage at time set as the off time.

The radio communication terminal may further include a waiting-time calculating section that calculates waiting time since the data reception continuation/suspension determining section determines suspension of data reception until the data reception continuation/suspension determining section determines restart of the data reception, the waiting-time calculating section calculating the waiting time according to the current usage level.

The radio communication terminal may further include a waiting-time calculating section that calculates waiting time since the data reception continuation/suspension determining section determines suspension of data reception until the data reception continuation/suspension determining section determines restart of the data reception, the waiting-time calculating section calculating the waiting time according to the current-time-zone level of usage.

In the radio communication terminal, the data reception continuation/suspension determining section may determine suspension of data reception, when the current usage level exceeding the off-time level of usage is calculated, or when the calculated current usage level exceeds a predetermined range based on actual results.

In the radio communication terminal, the waiting-time calculating section may calculate a waiting time longer than the waiting time calculated according to the current usage level, when the current usage level exceeding the off-time level of usage is calculated, or when the calculated current usage level exceeds a predetermined range based on actual results.

In the radio communication terminal, the waiting-time calculating section may calculate a waiting time longer than the waiting time calculated according to the current-time-zone level of usage, when the current usage level exceeding the off-time level of usage is calculated, or when the calculated current usage level exceeds a predetermined range based on actual results.

In the radio communication terminal, the link-usage level calculating section may calculate a current-time resource allocation ratio indicating an allocation ratio of the radio resources associated with data reception in the current radio communication terminal as the current usage level, and the data reception continuation/suspension determining section may determine continuation of data reception when the current-time resource allocation ratio is equal to or higher than a reference resource allocation ratio being a threshold, and determine suspension of data reception when the current-time resource allocation ratio is lower than the reference resource allocation ratio.

The radio communication terminal may further include a threshold calculating section that calculates a reference resource allocation ratio based on an off-time resource allocation ratio indicating an allocation ratio of the radio resources associated with data reception in the radio communication terminal during the off time of the radio link. The link-usage level calculating section may calculate the off-time resource allocation ratio at the time set as the off time.

In the radio communication terminal, the link-usage level calculating section may calculate a current-time-zone resource allocation ratio indicating an allocation ratio of the radio recourses associated with data reception in the radio communication terminal in the current time zone based on the current-time resource allocation ratio and another allocation ratio of the radio resources calculated in the current time zone, when the current-time resource allocation ratio is calculated. The data reception continuation/suspension determining section may determine continuation of data reception when the current-time-zone resource allocation ratio instead of the current-time resource allocation ratio is equal to or higher than the reference resource allocation ratio, and determine suspension of data reception when the current-time-zone resource allocation ratio is lower than the reference resource allocation ratio.

The radio communication terminal may further include a waiting-time calculating section that calculates waiting time since the data reception continuation/suspension determining section determines suspension of data reception until the data reception continuation/suspension determining section determines restart of the data reception, and the waiting-time calculating section may calculate the waiting time according to the current-time resource allocation ratio.

The radio communication terminal may further include a waiting-time calculating section that calculates waiting time since the data reception continuation/suspension determining section determines suspension of data reception in the data reception continuation/suspension determining section until the data reception continuation/suspension determining section determines restart of the data reception, and the waiting-time calculating section may calculate the waiting time according to the current-time-zone resource allocation ratio.

In the radio communication terminal, the data reception continuation/suspension determining section may determine suspension of data reception when the current-time resource allocation ratio exceeding the off-time resource allocation ratio is calculated, or when the calculated current-time resource allocation ratio exceeds a predetermined range based on actual results.

In the radio communication terminal, the waiting-time calculating section may calculate the waiting time longer than the waiting time calculated according to the current-time resource allocation ratio when the current-time resource allocation ratio exceeding the off-time resource allocation ratio is calculated, or when the calculated current-time resource allocation ratio exceeds the predetermined range based on actual results.

In the radio communication terminal, the waiting-time calculating section may calculate the waiting time longer than the waiting time calculated according to the current-time-zone resource allocation ratio when the current-time resource allocation ratio exceeding the off-time resource allocation ratio is calculated, or when the calculated current-time resource allocation ratio exceeds the predetermined range based on actual results.

In the radio communication terminal, the link-usage level calculating section may calculate a current-time throughput indicating a throughput associated with current data reception in the radio communication terminal, as the current usage level. The data reception continuation/suspension determining section may determine continuation of data reception when the current-time throughput is equal to or more than a reference throughput being a threshold, and determine suspension of data reception when the current-time throughput is less than the reference throughput.

The radio communication terminal may further include a threshold calculating section that calculates the reference throughput based on an off-time throughput indicating a throughput associated with data reception in the radio communication terminal during the off time of the radio link. The link-usage level calculating section may calculate the off-time throughput at the time set as the off time.

In the radio communication terminal the link-usage level calculating section may calculate a current time-zone throughput indicating a throughput associated with data reception in the radio communication terminal in the current time zone, based on the current-time throughput and other throughputs calculated in the current time zone, when the current-time throughput is calculated. The data reception continuation/suspension determining section may determine continuation of data reception when the current-time-zone throughput instead of the current-time throughput is equal to or more than the reference throughput, and determine suspension of data reception when the current-time-zone throughput is less than the reference throughput.

The radio communication terminal may further include a waiting-time calculating section that calculates waiting time since the data reception continuation/suspension determining section determines suspension of data reception in the data reception continuation/suspension determining section until the data reception continuation/suspension determining section determines restart of the data reception, and the waiting-time calculating section may calculate the waiting time according to the current-time throughput.

The radio communication terminal may further include a waiting-time calculating section that calculates waiting time since the data reception continuation/suspension determining section determines suspension of data reception in the data reception continuation/suspension determining section until the data reception continuation/suspension determining section determines restart of the data reception, and the waiting-time calculating section may calculate the waiting time according to the current-time-zone throughput.

In the radio communication terminal, the data reception continuation/suspension determining section may determine suspension of data reception when the current-time throughput exceeding the off-time throughput is calculated, or when the calculated current-time throughput exceeds a predetermined range based on actual results.

In the radio communication terminal, the waiting-time calculating section may calculate waiting time longer than the waiting time calculated according to the current-time throughput, when the current-time throughput exceeding the off-time throughput is calculated, or when the calculated current-time throughput exceeds the predetermined range based on actual results.

In the radio communication terminal, the waiting-time calculating section may calculate waiting time longer than the waiting time calculated according to the current-time-zone throughput, when the current-time throughput exceeding the off-time throughput is calculated, or when the calculated current-time throughput exceeds the predetermined range based on actual results.

A radio communication terminal according to a third aspect of the present invention includes a link-usage level calculating section that calculates usage level of a radio link, the link-usage level calculating section calculating, as the level of usage, an aggregate obtained by aggregating pieces of information transmitted from a base station, the information being information for limiting an uplink speed of the radio communication terminal; and a data transmission continuation/suspension determining section that determines continuation of data transmission or suspension of data transmission according to the level of usage calculated by the link-usage level calculating section, the data transmission continuation/suspension determining section determining continuation of data transmission when the aggregate is less than a predetermined threshold and determines suspension of data transmission when the aggregate is equal to or more than the predetermined threshold.

According to one embodiment of the present invention, because the radio resources are allocated to data traffic which does not require real-time performance at all only when there are enough radio resources, the radio resources can be used reasonably. Moreover, while on one hand more radio resources are allocated to users of the application requiring real-time performance, on the other hand, quite low rate setting is available with respect to users of the application which does not require real-time performance at all. Accordingly, a service that can better convince respective users can be provided.

DETAILED DESCRIPTION OF THE INVENTION

A radio communication terminal 10 according to one embodiment of the present invention communicates with a server on a network (for example, on the Internet). A transmission path of a radio link in a direction from the server to the radio communication terminal 10 (downlink) is controlled in a time-sharing manner. Accordingly, a throughput per radio communication terminal depends on the number of simultaneous download sessions. That is, when a plurality of radio communication terminals performs download simultaneously, the throughput decreases.

Figure 1:
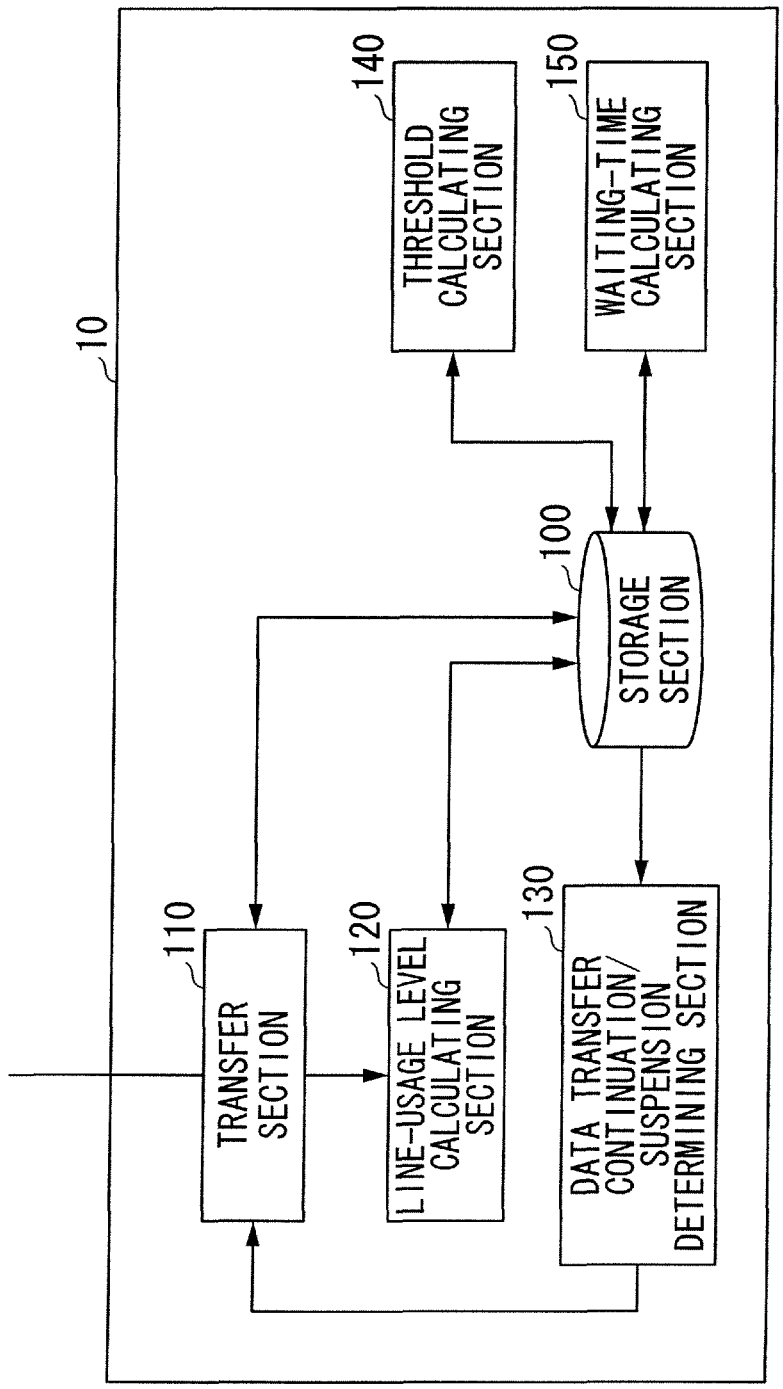
FIG. 1 is a block diagram showing a configuration of a radio communication terminal according to an embodiment of the present invention.

Hereunder, the embodiment of the present invention will be explained in detail with reference to the accompanying drawings. As shown in FIG. 1, the radio communication terminal 10 includes a storage section 100, a transfer section 110, a link-usage level calculating section 120, a data transfer continuation/suspension determining section 130 (corresponding to a data reception continuation/suspension determining section and a data transmission continuation/suspension determining section), a threshold calculating section 140, and a waiting-time calculating section 150.

The transfer section 110 transmits data stored in the storage section 100 to the outside via the radio link. The transfer section 110 receives data from the outside via the radio link. The transfer section 110 stores the received data in the storage section 100, and supplies the data to the link-usage level calculating section 120. Transfer of data by the transfer section 110 is controlled by the data transfer continuation/suspension determining section 130.

The storage section 100 stores various types of data. Specifically, the storage section 100 stores data received by the transfer section 110 and data to be transmitted by the transfer section 110.

Moreover, the storage section 100 stores data calculated by the link-usage level calculating section 120, data calculated by the threshold calculating section 140, and data calculated by the waiting-time calculating section 150.

The link-usage level calculating section 120 calculates a level of usage of the radio link associated with the data transfer by the current own terminal (hereinafter, referred to as "current usage level"). Specifically, the link-usage level calculating section 120 calculates either one of an allocation ratio of radio resources associated with the data transfer by the current own terminal (hereinafter, referred to as "current-time resource allocation ratio") or a throughput associated with the data transfer by the current own terminal (hereinafter, referred to as "current-time throughput"), as the current usage level. The link-usage level calculating section 120 stores the calculated current-time resource allocation ratio and the calculated current-time throughput, in the storage section 100. The resource allocation ratio is an amount of radio resources allocated to the own terminal included in the entire amount of the radio resources (an amount of radio resources allocatable to all the terminals).

The link-usage level calculating section 120 calculates the level of usage of the radio link associated with data reception in the own terminal at a time set as an off time of the radio link (hereinafter, referred to as "off-time level of usage").

Specifically, in the case where the current-time resource allocation ratio has been calculated, the link-usage level calculating section 120 calculates an allocation ratio of radio resources associated with data reception in the own terminal during the off time, as the off-time level of usage (hereinafter, referred to as "off-time resource allocation ratio"). In the case where the current-time throughput has been calculated, the link-usage level calculating section 120 calculates the throughput associated with data reception in the own terminal during the off time (hereinafter, referred to as "off-time throughput"). The link-usage level calculating section 120 stores the calculated off-time resource allocation ratio and the calculated off-time throughput, in the storage section 100.

The link-usage level calculating section 120 may calculate the level of usage of the radio link associated with data reception in the own terminal in a current time zone (hereinafter, referred to as "current-time-zone level of usage") based on the current usage level and another level of usage calculated in the current time zone. Specifically, in the case where the current-time resource allocation ratio has been calculated, the link-usage level calculating section 120 may calculate an allocation ratio of the radio resources associated with data reception in the own terminal in the current time zone (hereinafter, referred to as "current-time-zone level of usage") based on the current time resource allocation ratio and another radio resource allocation ratio calculated in the current time zone. In the case where the current-time throughput has been calculated, the link-usage level calculating section 120 may calculate the throughput associated with data reception in the own terminal in the current time zone (hereinafter, referred to as "current-time-zone throughput") based on the current-time throughput and another throughput calculated in the current time zone. The link-usage level calculating section 120 stores the calculated current-time-zone resource allocation ratio and the calculated current-time-zone throughput, in the storage section 100.

The link-usage level calculating section 120 may calculate an aggregate obtained by aggregating pieces of information transmitted from a base station, which is information for limiting an uplink speed of the radio communication terminal, as the current usage level. The link-usage level calculating section 120 stores the calculated aggregate in the storage section 100.

The threshold calculating section 140 calculates a reference level of usage being a threshold based on the off-time level of usage. Specifically, in the case where the off-time resource allocation ratio is stored in the storage section 100, the threshold calculating section 140 calculates a reference resource allocation ratio based on the off-time resource allocation ratio. In the case where the off-time throughput is stored in the storage section 100, the threshold calculating section 140 calculates a reference throughput based on the off-time throughput. The threshold calculating section 140 stores the calculated reference resource allocation ratio and the calculated reference throughput, in the storage section 100.

The waiting-time calculating section 150 calculates waiting time since determination of suspension of data reception in the data transfer continuation/suspension determining section 130 until restart of the data transfer. Specifically, the waiting-time calculating section 150 calculates the waiting time according to the current usage level or the current-time-zone level of usage. More specifically, in the case where the current-time resource allocation ratio and the current-time-zone resource allocation ratio are stored in the storage section 100, the waiting-time calculating section 150 calculates the waiting time according to the current-time-zone resource allocation ratio. In the case where only the current-time resource allocation ratio is stored, the waiting-time calculating section 150 calculates the waiting time according to the current-time resource allocation ratio. In the case where the current-time throughput and the current-time-zone throughput are stored in the storage section 100, the waiting-time calculating section 150 calculates the waiting time according to the current-time-zone throughput. In the case where only the current-time throughput is stored, the waiting-time calculating section 150 calculates the waiting time according to the current-time throughput. The waiting-time calculating section 150 stores the calculated waiting time in the storage section 100.

The waiting-time calculating section 150 may calculate waiting time longer than that calculated according to the current-time-zone level of usage, when the current usage level exceeding the off-time level of usage is calculated, or when the calculated current usage level exceeds the predetermined range based on actual results. For example, when the current-time resource allocation ratio exceeding the off-time resource allocation ratio is calculated, or when the calculated current-time resource allocation ratio exceeds the predetermined range based on actual results, the waiting-time calculating section 150 calculates the waiting time longer than that calculated according to the current-time resource allocation ratio or the current-time-zone resource allocation ratio. For example, when the current-time throughput exceeding the off-time throughput is calculated or the calculated current-time throughput exceeds the predetermined range based on actual results, the waiting-time calculating section 150 calculates the waiting time longer than that calculated according to the current-time throughput or the current-time-zone throughput.

The data transfer continuation/suspension determining section 130 determines start, continuation, or suspension of data transfer by the transfer section 110 according to the level of usage calculated by the link-usage level calculating section 120. Specifically, the data transfer continuation/suspension determining section 130 determines continuation of data reception when the current usage level is equal to or more than the reference level of usage. In contrast, the data transfer continuation/suspension determining section 130 determines suspension of data reception when the current usage level is less than the reference level of usage. More specifically, in the case where the current-time resource allocation ratio is stored in the storage section 100, the data transfer continuation/suspension determining section 130 determines continuation of data reception when the current-time resource allocation ratio is equal to or higher than the reference resource allocation ratio, and determines suspension of data reception when the current-time resource allocation ratio is lower than the reference resource allocation ratio. In the case where the current-time resource allocation ratio and the current-time-zone resource allocation ratio are stored in the storage section 100, the data transfer continuation/suspension determining section 130 determines continuation of data reception when the current-time-zone resource allocation ratio is equal to or higher than the reference resource allocation ratio, and determines suspension of data reception when the current-time-zone resource allocation ratio is lower than the reference resource allocation ratio.

In the case where the current-time throughput is stored in the storage section 100, the data transfer continuation/suspension determining section 130 determines continuation of data reception when the current-time throughput is equal to or higher than the reference throughput, and determines suspension of data reception when the current-time throughput is lower than the reference throughput. In the case where the current-time throughput and the current-time-zone throughput are stored in the storage section 100, the data transfer continuation/suspension determining section 130 determines continuation of data reception when the current-time-zone throughput is equal to or higher than the reference throughput, and determines suspension of data reception when the current-time-zone throughput is lower than the reference throughput.

When the current usage level exceeding the off-time level of usage is calculated, or when the calculated current usage level exceeds the predetermined range based on actual results, the data transfer continuation/suspension determining section 130 may determine suspension of data reception. For example, when the current-time resource allocation ratio exceeding the off-time resource allocation ratio is calculated, or when the calculated current-time resource allocation ratio exceeds the predetermined range based on actual results, the data transfer continuation/suspension determining section 130 determines suspension of data reception. When the current-time throughput exceeding the off-time throughput is calculated, or when the calculated current-time throughput exceeds the predetermined range based on actual results, the data transfer continuation/suspension determining section 130 determines suspension of data reception.

When the current-time-zone level of usage exceeding the off-time level of usage is calculated or when the calculated current-time-zone level of usage exceeds a predetermined range based on actual results, the data transfer continuation/suspension determining section 130 may determine suspension of data reception. For example, when the current-time-zone resource allocation ratio exceeding the off-time resource allocation ratio is calculated, or when the calculated current-time-zone resource allocation ratio exceeds the predetermined range based on actual results, the data transfer continuation/suspension determining section 130 determines suspension of data reception. When the current-time-zone throughput exceeding the off-time throughput is calculated, or when the calculated current-time-zone throughput exceeds the predetermined range based on actual results, the data transfer continuation/suspension determining section 130 determines suspension of data reception.

The data transfer continuation/suspension determining section 130 may determine continuation of data transmission when an aggregate stored in the storage section 100 is less than a predetermined threshold, and may determine suspension of data transmission when the aggregate is equal to or larger than the predetermined threshold.

Figure 2:
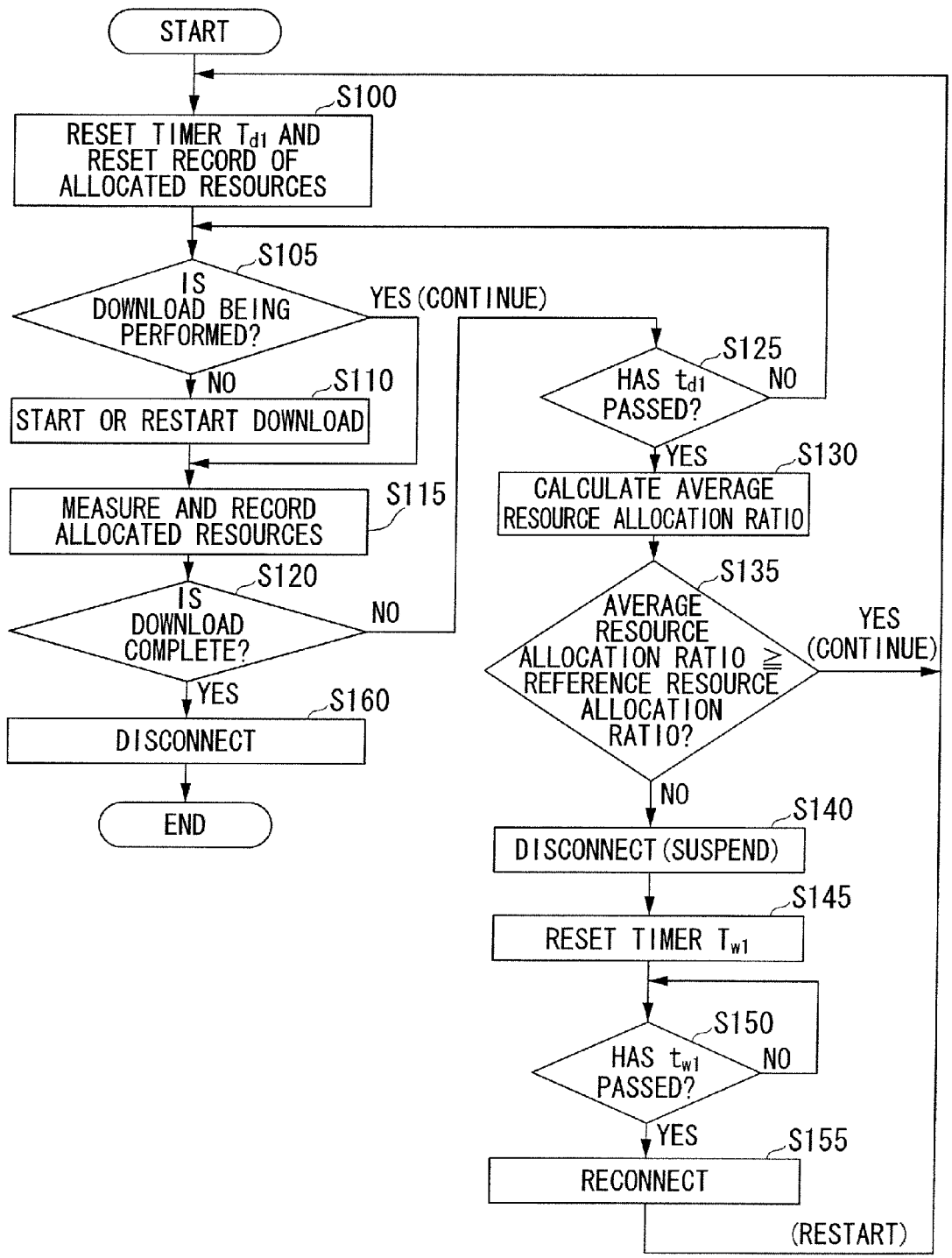
FIG. 2 is a flowchart showing one example of an operation of the radio communication terminal shown in FIG. 1.

Hereunder an operation of the radio communication terminal 10 will be explained with reference to FIG. 2. FIG. 2 is a flowchart showing an operation when the radio communication terminal 10 downloads a file by using the resource allocation ratio. The flowchart shown in FIG. 2 (and also in FIG. 3A to FIG. 6) starts when the radio communication terminal 10 is connected to a server by using a point-to-point (PPP) protocol.

It is supposed that the file to be downloaded by the radio communication terminal 10 in the flowchart shown in FIG. 2 (and also in FIG. 3A to FIG. 5) does not require real-time performance, and download needs to be complete sometime. That is, it is supposed that data traffic associated with the file download does not require real-time performance at all.

After establishment of a PPP session, the radio communication terminal 10 resets a timer $T_{d1}$ (a timer value for measuring unit download time $t_{d1}$) and resets a record of current-time allocation resources (step S100). Subsequently, the radio communication terminal 10 determines whether download is being performed now (step S105). When determined that download is not being performed (step S105: No), the radio communication terminal 10 starts (or restarts) download (step S110).

Subsequent to step S105 (Yes) or step S110, the radio communication terminal 10 measures and records the radio resources allocated to the own terminal (step S115). Specifically, the radio communication terminal 10 counts the number of time slots allocated to the own terminal.

Next, the radio communication terminal 10 determines whether download is complete or not (step S120). When determined that the download is not complete (step S120: No), the radio communication terminal 10 determines whether the unit download time $t_{d1}$ has passed (step S125).

When the radio communication terminal 10 determines that the unit download time $t_{d1}$ has not passed (step S125: No), the process returns to step S105.

On the other hand, when determined that the unit download time $t_{d1}$ has passed (step S125: Yes), the radio communication terminal 10 calculates an average resource allocation ratio R(t), which is one example of the current-time resource allocation ratio, based on the record of the number of time slots allocated in the unit download time $t_{d1}$ (step S130). The radio communication terminal 10 having calculated the average resource allocation ratio R(t), determines whether the average resource allocation ratio R(t) is equal to or higher than a reference resource allocation ratio $R_C$ (step S135).

When the radio communication terminal 10 determines that the average resource allocation ratio R(t) is equal to or higher than the reference resource allocation ratio $R_C$ (step S135: Yes), the process returns to step S100. That is, the radio communication terminal 10 determines continuation of file download when there are enough radio resources.

On the other hand, when determined that the average resource allocation ratio R(t) is lower than the reference resource allocation ratio $R_C$ (step S135: No), the radio communication terminal 10 disconnects the PPP session (step S140). That is, the radio communication terminal 10 determines suspension of file download when there are not enough radio resources.

After disconnection of the PPP session, the radio communication terminal 10 resets a timer $T_{W1}$ (a timer value for measuring waiting time $t_{W1}$) (step S145), and then determines whether the waiting time $t_{W1}$ has passed (step S150). When the radio communication terminal 10 determines that the waiting time $t_{W1}$ has not passed yet (step S150: No), step S150 is repeated (stands by) until the waiting time $t_{W1}$ has passed (step S150: Yes).

The waiting time $t_{W1}$ is a variation determined based on the average resource allocation ratio R(t) or the like, and is calculated, for example, according to following equation (1).

$$t_{W1} = (1/R(t)) \times 2^n \times T_{W0} \qquad (1)$$

where n denotes a back-off counter, and $T_{W0}$ denotes a base value of the waiting time determined by a random number.

The radio communication terminal 10 may hold a predetermined maximum waiting time $t_{WMAX}$ stored in advance, and compares the waiting time $t_{W1}$ calculated according to equation (1) with the maximum waiting time $t_{WMAX}$. If the waiting time $t_{W1}$ exceeds the maximum waiting time $t_{WMAX}$, the maximum waiting time $t_{WMAX}$ may be assigned to the waiting time $t_{W1}$. That is, an upper limit of the waiting time $t_{W1}$ may be specified by the maximum waiting time $t_{WMAX}$. The same applies to waiting times $t_{W2}$, $t_{W3}$, $t_{W4}$, and $t_{W5}$ described later.

On the other hand, when determined that the waiting time $t_{W1}$ has passed (step S150: Yes), the radio communication terminal 10 reconnects the PPP session (step S155), and returns to step S100. That is, the radio communication terminal 10 determines restart of download.

When determined that download is complete (step S120: Yes), the radio communication terminal 10 disconnects the PPP session (step S160), and ends the flowchart in FIG. 2.

According to the flowchart shown in FIG. 2, the radio communication terminal 10 downloads a file for every unit download time $t_{d1}$, and calculates the average resource allocation ratio R(t). The radio communication terminal 10 compares the average resource allocation ratio R(t) with the reference resource allocation ratio $R_C$ every time the unit download time $t_{d1}$ has passed. When the average resource allocation ratio R(t) is equal to or higher than the reference resource allocation ratio $R_C$, the radio communication terminal 10 continues download for the subsequent unit download time $t_{d1}$. When the average resource allocation ratio R(t) is lower than the reference resource allocation ratio $R_C$, the radio communication terminal 10 suspends download. The radio communication terminal 10 having suspended download, restarts download after the waiting time $t_{W1}$ has passed.

Therefore, when the average resource allocation ratio R(t) is low, that is, there are not enough radio resources, download of a file, which does not require real-time performance and needs to complete download sometime, is suspended. Accordingly, the radio resources can be used effectively.

Figure 3A:
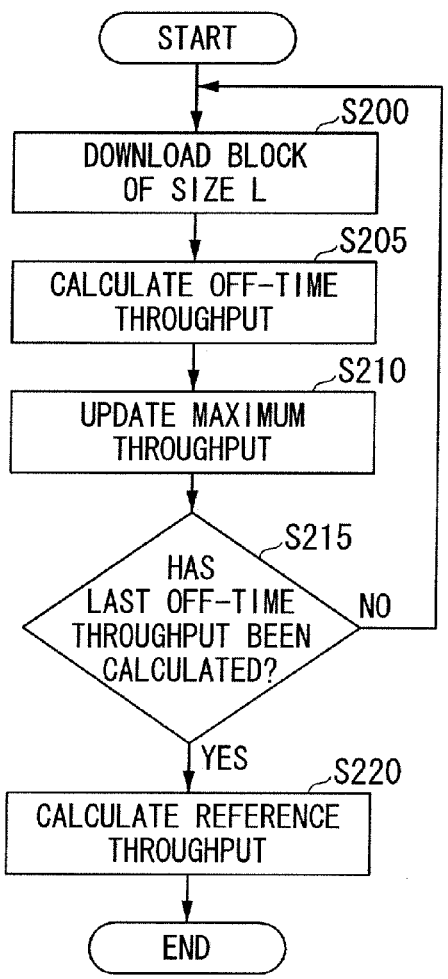
FIG. 3A is a flowchart showing one example of an operation of the radio communication terminal shown in FIG. 1.
Figure 3B:
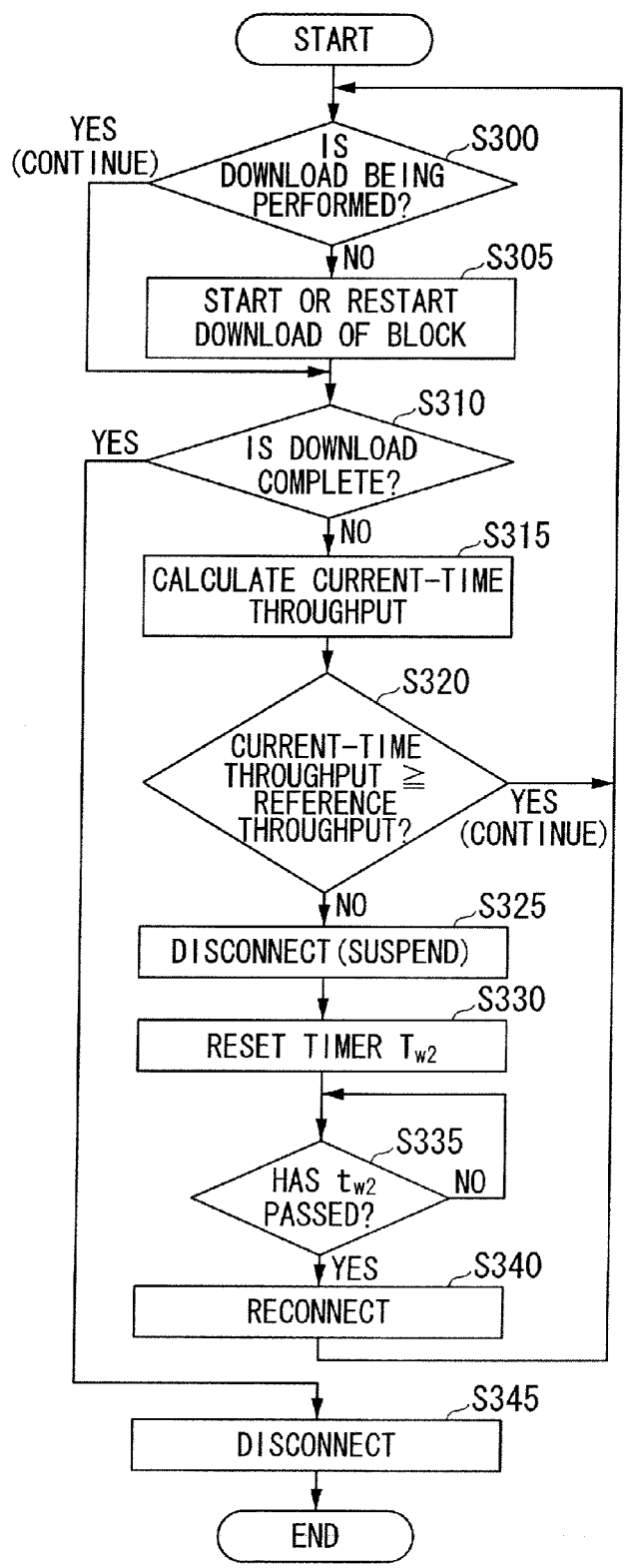
FIG. 3B is a flowchart showing one example of an operation of the radio communication terminal shown in FIG. 1.

Another operation of the radio communication terminal 10 will be explained with reference to FIGS. 3A and 3B. FIGS. 3A and 3B are flowcharts showing the operation when the radio communication terminal 10 downloads a file by using a throughput. It is supposed that a download server to which the radio communication terminal 10 is connected, downloads (transmits) a file to be downloaded for each of a plurality of fragments (hereinafter, referred to as a "block"). For example, the download server may store the file to be downloaded in block units beforehand, and transmit the file for each block.

In a case where the size of the file is O and the size of the block is L, then O=n·L+L' (where n is an integer, and L'<L), and data of size L' is also treated as a block (size L'). The radio communication terminal 10 stores time T to be connected to the download server as the off time (for example, AM 02:00, AM 02:30, etc., AM 04:30, and AM 05:00, 7 times a day). The time to be set as the off time may be the same everyday or different.

In FIG. 3A, the radio communication terminal 10 downloads a block for a threshold measurement test or a block associated with the file to be downloaded at certain time t set as the off time (step S200). The radio communication terminal 10 calculates an off-time throughput S(t) associated with time t (step S205). That is, the radio communication terminal 10 calculates off-time throughput S(t)=(size L/download time) or off-time throughput S(t)=(size L'/download time). Subsequently, the radio communication terminal 10 updates a maximum throughput $S_{MAX}$ according to following equation (2) (step S210).

$$S_{MAX} \leftarrow \text{MAX}\{S(i), S_{MAX}\} \quad (2)$$

where i denotes an index at each time t (i=time $t_1$, time $t_2$, and so forth).

The radio communication terminal 10 determines whether the last off-time throughput S(t) has been calculated (step S215). When the radio communication terminal 10 determines that the last off-time throughput S(t) has not been calculated yet (step S215: No), the process returns to step S200.

On the other hand, when determined that the last off-time throughput S(t) has been calculated (step S215: Yes), the radio communication terminal 10 calculates a reference throughput $S_C$ based on the maximum throughput $S_{MAX}$ (step S220). For example, the radio communication terminal 10 calculates the reference throughput $S_C$ according to following equation (3).

$$S_C = k \times S_{MAX} \quad (3)$$

where k denotes a coefficient (about ½ to ⅔).

Then the flowchart in FIG. 3A ends. The radio communication terminal 10 holds the maximum throughput $S_{MAX}$ and the reference throughput $S_C$ until measurement of the off-time throughput starts next day.

In FIG. 3B, the radio communication terminal 10 determines whether download is being performed now (step S300). When determined that download is not being performed now (step S300: No), the radio communication terminal 10 starts or restarts download of a block (step S305).

Subsequent to step S300 (Yes) or step S305, the radio communication terminal 10 determines whether download of the entire file (all blocks constituting the file) is complete (step S310). When determined that download of the entire file is not complete (step S310: No), the radio communication terminal 10 calculates a current-time throughput S(t) (step S315). That is, the radio communication terminal 10 calculates current-time throughput S(t)=(size L/download time) or current-time throughput S(t)=(size L'/download time). The radio communication terminal 10, having calculated the current-time throughput S(t) determines whether the current-time throughput S(t) is equal to or higher than the reference throughput $S_C$ (step S320).

When the radio communication terminal 10 determines that the current-time throughput S(t) is equal to or higher than the reference throughput $S_C$ (step S320: Yes), the process returns to step S300. That is, when there are enough radio resources, the radio communication terminal 10 determines continuation of file download.

On the other hand, when determined that the current-time throughput S(t) is lower than the reference throughput $S_C$ (step S320: No), the radio communication terminal 10 disconnects the PPP session (step S325). That is, when there are not enough radio resources, the radio communication terminal 10 determines suspension of file download.

Subsequent to step S325 (after disconnection of the PPP session), the radio communication terminal 10 resets a timer $T_{W2}$ (step S330), and determines whether the waiting time $t_{W2}$ has passed (step S335). When the radio communication terminal determine that the waiting time $t_{W2}$ has not passed yet (step S335: No), step S335 is repeated (stands by) until the waiting time $t_{W2}$ has passed (step S335: Yes).

The waiting time $t_{W2}$ is a variation determined based on the current-time throughput S(t) or the like, and is calculated, for example, according to following equation (4).

$$t_{W2} = (1/S(t)) \times 2^n \times T_{W0} \quad (4)$$

where n denotes a back-off counter, and $T_{W0}$ denotes a base value of the waiting time determined by a random number.

On the other hand, when determined that the waiting time $t_{W2}$ has passed (step S335: Yes), the radio communication terminal 10 reconnects the PPP session (step S340), and the process returns to step S300. That is, the radio communication terminal 10 determines restart of file download.

In step S310, when determined that download of the entire file is complete (step S310: Yes), the radio communication terminal 10 disconnects the PPP session (step S345), and the flowchart in FIG. 3B ends.

According to the flowchart shown in FIG. 3B, the radio communication terminal 10 executes download of the file for each block, and calculates the current-time throughput S(t) for each block. In the case where the current-time throughput S(t) has been calculated, the radio communication terminal 10 compares the current-time throughput S(t) with the reference throughput $S_C$. When the current-time throughput S(t) is equal to or higher than the reference throughput $S_C$, the radio communication terminal 10 executes download of the subsequent block. When the current-time throughput S(t) is lower than the reference throughput $S_C$, the radio communication terminal 10 suspends download of the subsequent block. The radio communication terminal 10 having suspended download of the block, restarts download of the block after the waiting time $t_{W2}$ has passed.

Therefore, when the current-time throughput S(t) is low, download of a file, which does not require real-time performance and needs to complete download sometime, is suspended. Accordingly, the radio resources can be used effectively.

Figure 4:
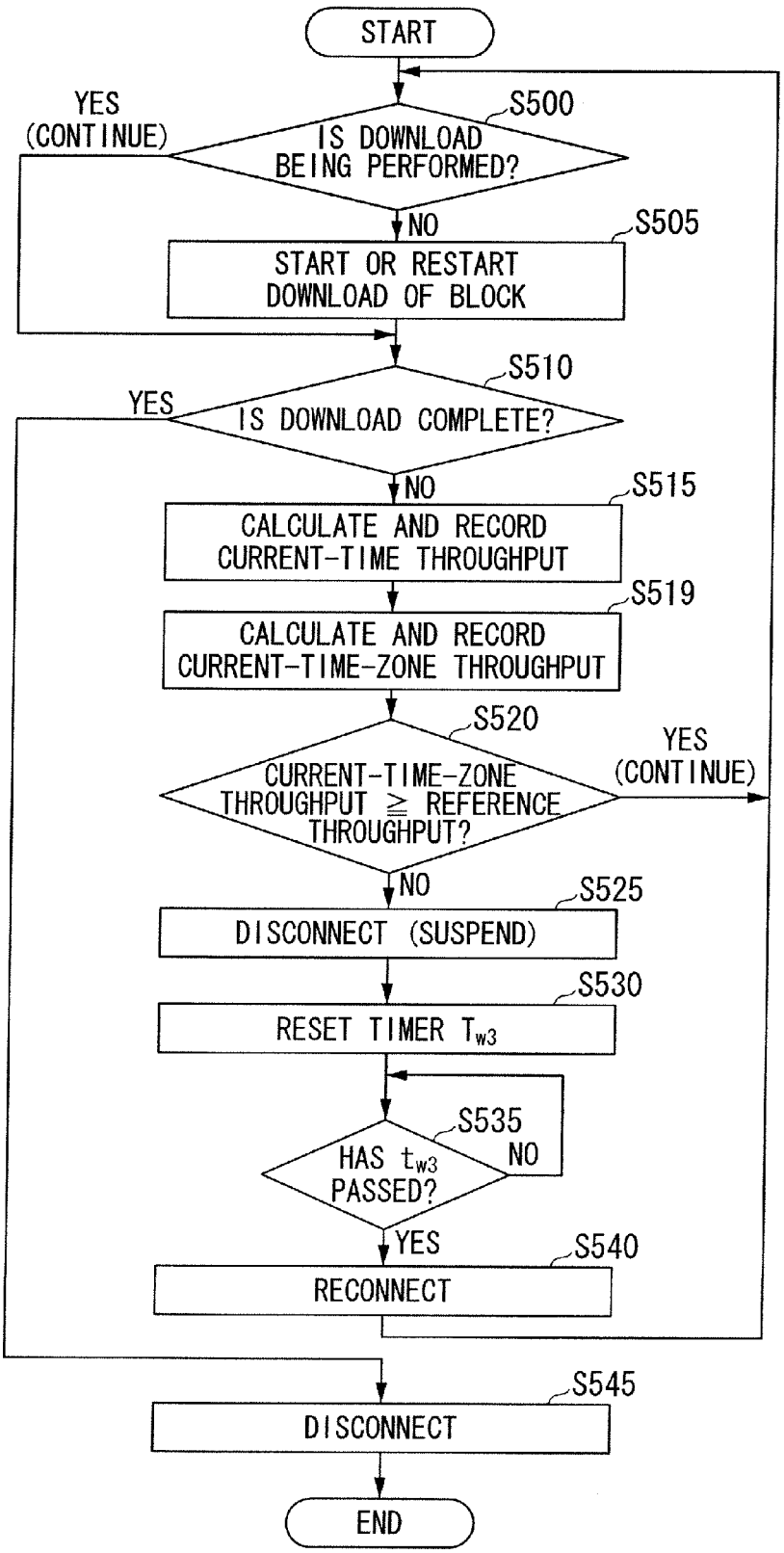
FIG. 4 is a flowchart showing one example of an operation of the radio communication terminal shown in FIG. 1.

Next, another operation of the radio communication terminal 10 will be explained with reference to FIG. 4. FIG. 4 is a flowchart showing an operation when the radio communication terminal 10 downloads a file by using the throughput. Steps S500, S505, S510, S525, S540, and S545 in the flowchart shown in FIG. 4 are the same as steps S300, S305, S310, S325, S340, and S345 in the flowchart shown in FIG. 3B, and hence part or all of the explanation thereof is omitted.

When determined that download of the entire file is not complete (Step S510: No), the radio communication terminal 10 calculates and records the current-time throughput S(t) (step S515).

The radio communication terminal 10 having calculated the current-time throughput S(t), calculates and records the current-time-zone throughput $S_D(i)$ based on the current-time throughput S(t) and other throughputs calculated in the current time zone (step S519). The radio communication terminal 10 calculates the current-time-zone throughput $S_D(i)$ according to following equations (5) and (6).

$$S_D(i,n) = x \times S(t) + (1-x) \times S_{D-1}(i) \tag{5}$$

$$S_D(i) = \text{Ave}_n \{S_D(i,n)\} \tag{6}$$

where i denotes an index indicating each time zone, n denotes an index indicating each throughput calculated based on the current-time throughput S(t) and $S_{D-1}(i)$ (n=1, 2, and so forth), D denotes an index indicating date, and x is a coefficient ($0 \leq x \leq 1$). That is, $S_{D-1}(i)$ is a throughput in a time zone i of the previous day. $S_D(i, n)$ is a throughput calculated based on the current-time throughput S(t) calculated at the n-th time in the time zone i and $S_{D-1}(i)$. $\text{Ave}_n \{S_D(i, n)\}$ is a mean value of n $S_D(i, n)$.

The radio communication terminal 10 having calculated the current-time-zone throughput $S_D(i)$, determines whether the current-time-zone throughput $S_D(i)$ is equal to or higher than the reference throughput $S_C$ (step S520).

When the radio communication terminal 10 determines that the current-time-zone throughput $S_D(i)$ is equal to or higher than the reference throughput $S_C$ (step S520: Yes), the process returns to step S500. That is, the radio communication terminal 10 determines continuation of file download when there are enough radio resources.

On the other hand, when determined that the current-time-zone throughput $S_D(i)$ is lower than the reference throughput $S_C$ (step S520: No), the radio communication terminal 10 disconnects the PPP session (step S525). That is, the radio communication terminal 10 determines suspension of file download when there are not enough radio resources.

Subsequent to step S525 (after disconnection of the PPP session), the radio communication terminal 10 resets a timer $T_{W3}$ (step S530), and determines whether the waiting time $t_{W3}$ has passed (step S535). When the radio communication terminal 10 determines that the waiting time $t_{W3}$ has not passed yet (step S535: No), step S535 is repeated (stands by) until the waiting time $t_{W3}$ has passed (step S535: Yes).

On the other hand, when determined that the waiting time $t_{W3}$ has passed (step S535: Yes), the radio communication terminal 10 reconnects the PPP session (step S540), and the process returns to step S500. That is, the radio communication terminal 10 determines restart of file download.

The waiting time $t_{W3}$ is a variation determined based on the current-time-zone throughput $S_D(i)$ or the like, and is calculated, for example, according to following equation (7).

$$t_{W3} = (1/S_D(i)) \times 2^n \times T_{W0} \tag{7}$$

where n denotes a back-off counter, and $T_{W0}$ denotes a base value of the waiting time determined by a random number.

According to the flowchart shown in FIG. 4, because suspension or connection of download is determined by using the current-time-zone throughput $S_D(i)$ obtained by smoothing the current-time throughput S(t) instead of the current-time throughput S(t), more stable determination can be performed.

The radio communication terminal 10 may determine suspension or connection of download by using a current-time-zone resource allocation ratio $R_D(i)$, as in the determination of suspension or connection of download by using the current-time-zone throughput $S_D(i)$. The radio communication terminal 10 calculates the current-time-zone resource allocation ratio $R_D(i)$ according to following equations (8) and (9).

$$R_D(i,n) = x \times R(t) + (1-x) \times R_{D-1}(i) \tag{8}$$

$$R_D(i) = \text{Ave}_n \{R_D(i,n)\} \tag{9}$$

where i denotes an index indicating each time zone, n denotes an index indicating each resource allocation ratio calculated based on the average resource allocation ratio R(t) and $R_{D-1}(i)$ (n=1, 2, and so forth), D denotes an index indicating date, and x is a coefficient ($0 \leq x \leq 1$). That is, $R_{D-1}(i)$ is a resource allocation ratio in the time zone i of the previous day. $R_D(i, n)$ is a resource allocation ratio calculated based on the average resource allocation ratio R(t) calculated at the n-th time in the time zone i and $R_{D-1}(i)$. $\text{Ave}_n \{R_D(i, n)\}$ is a mean value of n $R_D(i, n)$.

The waiting time $t_{W4}$ when using the current-time-zone resource allocation ratio $R_D(i)$ is a variation determined based on the current-time-zone resource allocation ratio $R_D(i)$ or the like, and is calculated, for example, according to following equation (10).

$$t_{W4} = (1/R_D(i)) \times 2^n \times T_{W0} \tag{10}$$

where n denotes a back-off counter, and $T_{W0}$ denotes a base value of the waiting time determined by a random number.

Figure 5:
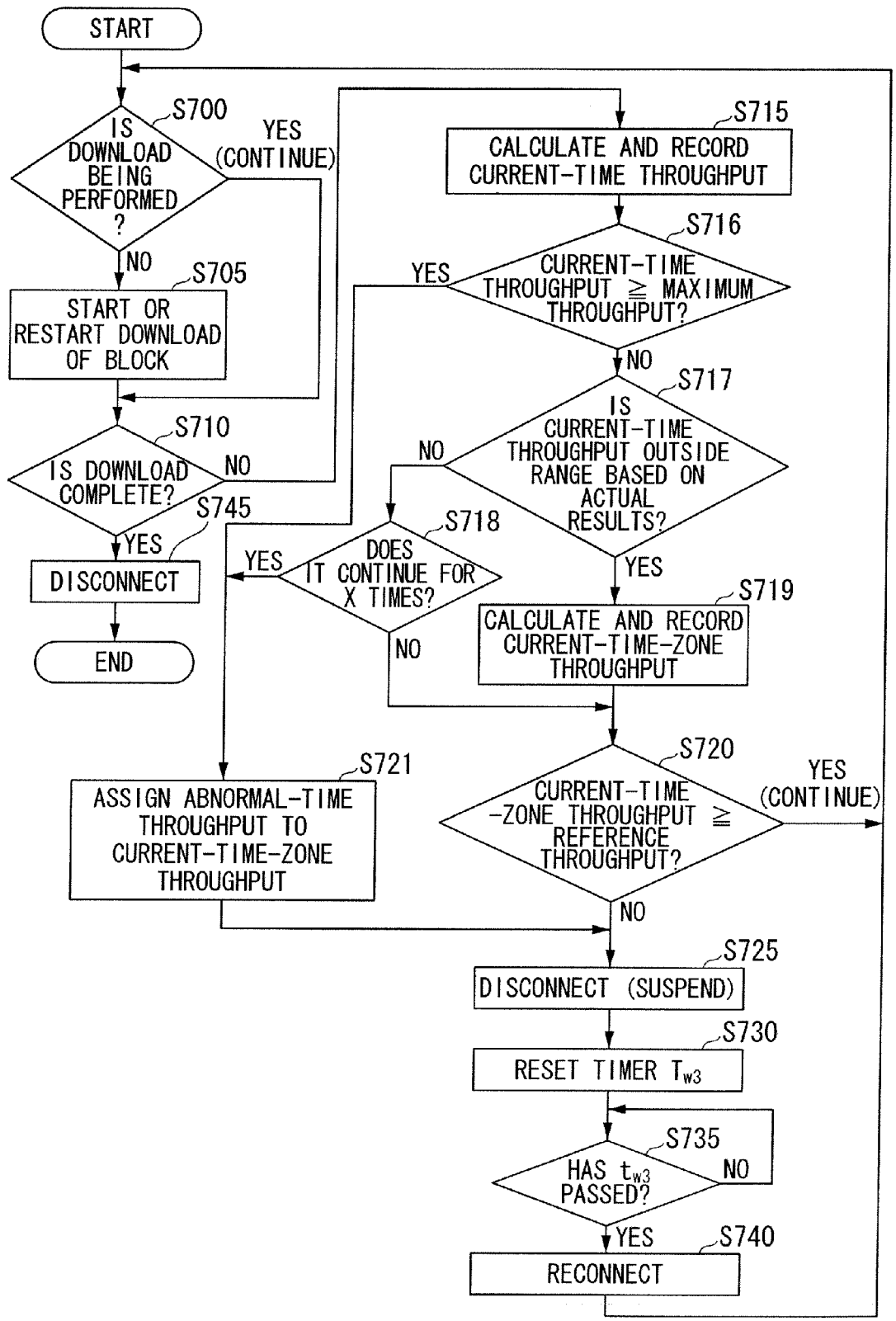
FIG. 5 is a flowchart showing one example of the operation of the radio communication terminal shown in FIG. 1.

Next, another operation of the radio communication terminal 10 will be explained with reference to FIG. 5. FIG. 5 is a flowchart showing an operation when the radio communication terminal 10 downloads a file by using the throughput. Steps S700, S705, S710, S715, S719, S720, S725, S730, S735, S740, and S745 in the flowchart shown in FIG. 5 are the same as steps S500, S505, S510, S515, S519, S520, S525, S530, S535, S540, and S545 in the flowchart shown in FIG. 4, and hence part or all of the explanation thereof is omitted.

The radio communication terminal 10 having calculated the current-time throughput S(t), determines whether the current-time throughput S(t) is equal to or higher than the maximum throughput $S_{Max}$ (step S716). When determined that the current-time throughput S(t) is not equal to or higher than the maximum throughput $S_{MAX}$ (step S716: No), the radio communication terminal 10 determines whether the current-time throughput S(t) is outside a predetermined range based on actual results (step S717). For example, when the following equation (11) is satisfied, the radio communication terminal 10 determines that the current-time throughput S(t) is outside the predetermined range based on actual results.

$$S(t)/S_{MAX} > \mu + k\sigma \tag{11}$$

where $\mu$ denotes an average of $(S(t)/S_{MAX})$, $\sigma$ denotes a variance of $(S(t)/S_{MAX})$, and k denotes a coefficient.

When determined that the current-time throughput S(t) is outside the predetermined range based on actual results (step S717: Yes), the radio communication terminal 10 determines whether the current-time throughput S(t) is outside the predetermined range based on actual results continuously for X times (step S718). For example, every time the process (step S718) is executed, the radio communication terminal 10 counts up a counter $C_X$, and when the counter $C_X$ reaches X times, the radio communication terminal 10 determines that the current-time throughput S(t) is outside the predetermined range based on actual results continuously for X times. The counter $C_X$ is initialized at the time of starting the flowchart, at the time of executing step S720, and at the time of executing step S721.

When determined that the current-time throughput S(t) is equal to or higher than the maximum throughput $S_{MAX}$ (step S716: Yes), or when determined that the current-time throughput S(t) is outside the predetermined range based on actual results continuously for X times (step S718: Yes), the radio communication terminal 10 assigns an abnormal-time throughput to the current-time-zone throughput $S_D(i)$ (step S721).

The abnormal-time throughput is a predetermined throughput applied to abnormal circumstances, and is a settable minimum throughput. Therefore, the time since execution of step S721 until step S719 is executed again becomes long, because the waiting time $t_{W3}$ is calculated based on the abnormal-time throughput.

According to the flowchart shown in FIG. 4, when the current-time throughput S(t) has an abnormal value, specifically, when the current-time throughput S(t) is equal to or higher than the maximum throughput $S_{MAX}$ (step S716: Yes), or the current-time throughput S(t) is outside the predetermined range based on actual results continuously for X times (step S718: Yes), suspension of download is determined. Therefore, when the current-time throughput S(t) has an abnormal value, a shift can be made toward a safe side (in a direction decreasing a load of radio resources). Moreover, when the current-time throughput S(t) has an abnormal value, the waiting time can be set longer, because the waiting time is calculated by using the abnormal-time throughput, which is the minimum throughput. Furthermore, because only the normal current-time throughput S(t) is used for calculation of the current-time-zone throughput $S_D(i)$ (step S719), suspension or connection of download can be determined more accurately.

The radio communication terminal 10 may determine suspension or connection of download by using the current-time-zone resource allocation ratio $R_D(i)$, as in the determination of suspension or connection of download by using the current-time-zone throughput $S_D(i)$. When the current-time-zone resource allocation ratio $R_D(i)$ is used, the radio communication terminal 10 determines that the current-time resource allocation ratio (average resource allocation ratio R(t)) is outside the predetermined range based on actual results, for example, when the following equation (12) is satisfied.

$$R(t) > \mu + k\sigma \quad (12)$$

where $\mu$ denotes an average of R(t), $\sigma$ denotes a variance of R(t), and k denotes a coefficient.

When the current-time-zone resource allocation ratio $R_D(i)$ is used, if the current-time resource allocation ratio has an abnormal value, the radio communication terminal 10 assigns an abnormal-time resource allocation ratio to the current-time-zone resource allocation ratio $R_D$ (step S721).

The abnormal-time resource allocation ratio is a predetermined resource allocation ratio applied to abnormal circumstances, and is a settable minimum resource allocation ratio. Therefore, the time since execution of step S721 until step S719 is executed again becomes long, because the waiting time $t_{W4}$ is calculated based on the abnormal-time resource allocation ratio.

Figure 6:
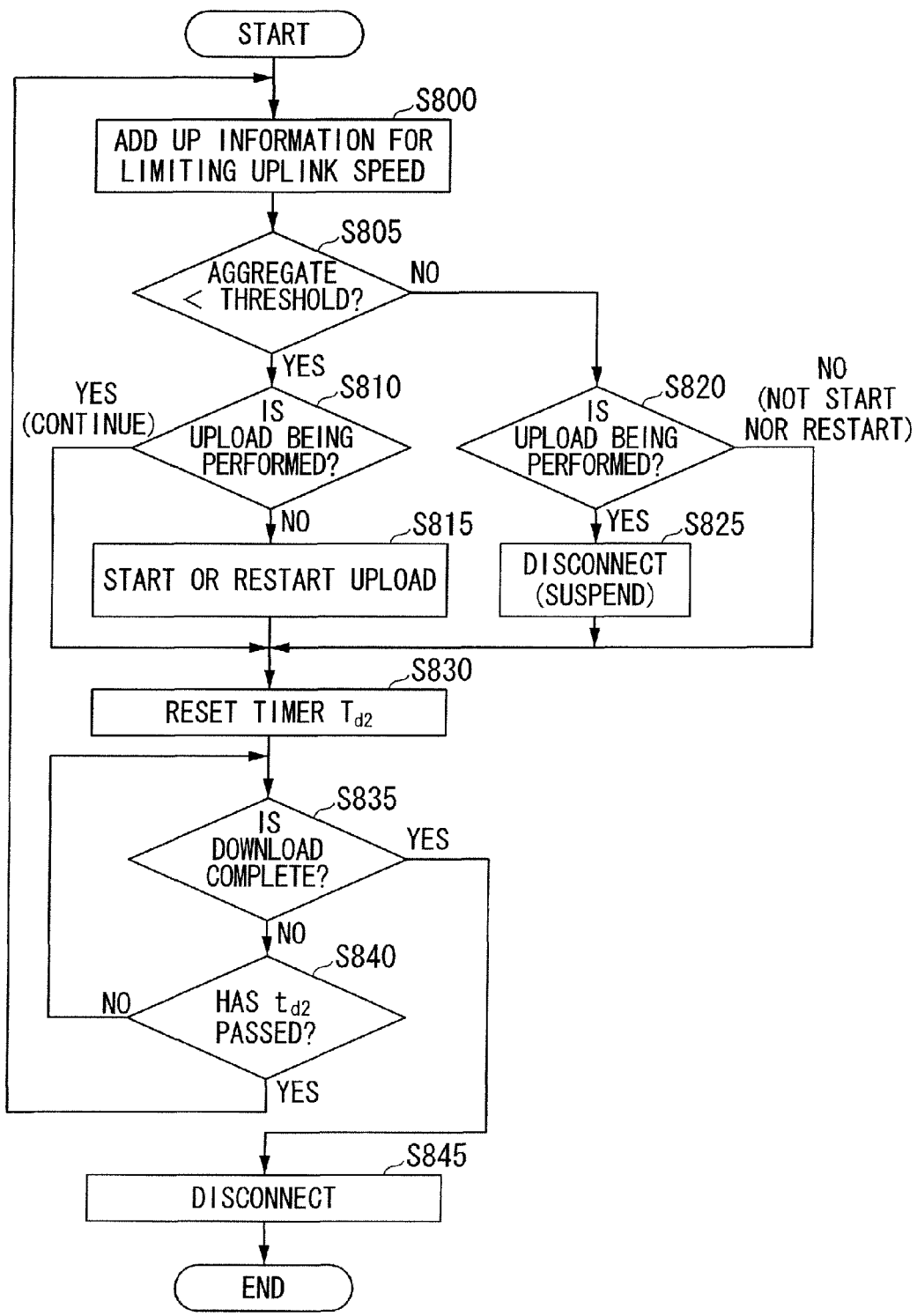
FIG. 6 is a flowchart showing one example of an operation of the radio communication terminal shown in FIG. 1.

Next, another operation of the radio communication terminal 10 will be explained with reference to FIG. 6. FIG. 6 is a flowchart showing an operation when the radio communication terminal 10 downloads a file by using information for limiting an uplink speed. In the flowchart shown in FIG. 6, a file to be downloaded by the radio communication terminal 10 is a file which does not require real-time performance and needs to complete download sometime.

The radio communication terminal 10 adds up pieces of information for limiting the uplink speed (step S800). The information for limiting the uplink speed is, for example, 1-bit information included in a beacon transmitted from a base station to the radio communication terminal 10, which is transmitted to decrease the uplink speed of the radio communication terminal 10 when there are not enough radio resources. For example, when the radio communication terminal 10 can receive up to P pieces of information for limiting the uplink speed within a predetermined time, and when Q pieces of information are actually received, an aggregate M becomes P/Q (from 0 to 1).

The radio communication terminal 10 having added up the pieces of information for limiting the uplink speed, determines whether the aggregate M is less than a threshold (step S805). When determined that the aggregate M is less than the threshold (step S805: Yes), the radio communication terminal 10 determines whether upload is now being performed (step S810). When determined that upload is not being performed (step S810: No), the radio communication terminal 10 starts (restarts) upload (step S815). That is, when there are enough radio resources, the radio communication terminal 10 starts (restarts) upload. When determined that upload is now being performed (step S810: Yes), the radio communication terminal 10 continues upload.

On the other hand, when determined that the aggregate M is equal to or larger than the threshold (step S805: No), the radio communication terminal 10 determines whether upload is now being performed (step S820). When determined that upload is now being performed (step S820: Yes), the radio communication terminal 10 disconnects the PPP session (step S825). That is, when there are not enough radio resources, the radio communication terminal 10 determines suspension of file upload. When determined that upload is not being performed (step S820: No), the radio communication terminal 10 maintains a disconnected state.

Subsequent to steps S810 (Yes), S815, S820 (No), or S825, the radio communication terminal 10 resets a timer $T_{d2}$ (step S830). Subsequently, the radio communication terminal 10 determines whether upload is complete (step S835). When determined that upload is not complete (step S835: No), the radio communication terminal 10 determines whether unit download time $t_{d2}$ has passed (step S840). When the radio communication terminal 10 determines that the unit download time $t_{d2}$ has not passed (step S840: No), the process returns to step S835.

On the other hand, when the radio communication terminal 10 determines that the unit upload time $t_{d2}$ has passed (step S840: Yes), the process returns to step S800. When determined that upload is complete (step S835: Yes), the radio communication terminal 10 disconnects the PPP session (step S845), and the flowchart in FIG. 6 ends.

According to the flowchart shown in FIG. 6, the radio communication terminal 10 uploads a file for every unit upload time $t_{d2}$, and calculates the aggregate M. The radio communication terminal 10 compares the aggregate M with the threshold after the unit upload time $t_{d2}$ has passed. If the aggregate M is less than the threshold, the radio communication terminal 10 continues upload during the next unit upload time $t_{d2}$. If the aggregate M is equal to or larger than the threshold, the radio communication terminal 10 suspends upload. The radio communication terminal 10 having suspended upload, may return to step S800 after a predetermined waiting time $t_{W5}$ longer than the unit upload time $t_{d2}$ has passed.

The waiting time $t_{W5}$ can be determined according to the aggregate M, for example, based on following equation (13).

$$t_{W5} = M \times 2^n \times T_{W0} \qquad (13)$$

where n denotes a back-off counter, and $T_{W0}$ denotes a base value of the waiting time determined by a random number.

The above-described various processes associated with the radio communication terminal 10 can be performed by recording a program for executing respective processes of the radio communication terminal 10 on a computer readable recording medium so that a computer system reads the program recorded on the recording medium and executes the program. The "computer system" referred to here may include an OS and hardware such as peripheral equipment. The "computer system" also includes a website providing environment (or display environment), when a WWW system is used. Moreover, the "computer readable recording medium" refers to a writable non-volatile memory such as a flexible disk, a magneto-optical disk, a ROM, or a flash memory, a transportable medium such as a CD-ROM, or a storage device such as a hard disk built into the computer system.

The "computer readable recording medium" includes one holding the program for a certain period of time, such as a volatile memory (for example, dynamic random access memory (DRAM)) inside the computer system, which becomes a server or a client when the program is transmitted via a network such as the Internet or a communication line such as a telephone line. The program may be transmitted to other computer systems from a computer system storing the program in the memory device or the like via a transmission medium or through a transmitted wave in the transmission medium. The "transmission medium" for transmitting the program refers to a medium having a function of transmitting information such as the network (communication network) such as the Internet or a communication link (communication line) such as the telephone line. The program may be one for realizing a part of the functions described above. Moreover, the program may be one that can realize the functions described above in combination with the program already recorded in the computer system, being a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A radio communication terminal comprising: a link-usage level calculating section that calculates a current-time resource allocation ratio indicating an amount of radio resources allocated to a current data reception in the radio communication terminal included in an entire amount of the radio resources; and a data reception continuation/suspension determining section that determines continuation of data reception when the current-time resource allocation ratio is equal to or higher than a reference resource allocation ratio being a threshold and determines determining suspension of data reception when the current-time resource allocation ratio is lower than the reference resource allocation ratio.

2. The radio communication terminal according to claim 1, further comprising:
a threshold calculating section that calculates the reference resource allocation ratio based on an off-time resource allocation ratio indicating an amount of radio resources allocated to the data reception in the radio communication terminal during off time of the radio link included in the entire amount of the radio resources, the link-usage level calculating section calculating the off-time level of usage at time set as the off time.

3. The radio communication terminal according to claim 1, further comprising:
a waiting-time calculating section that calculates waiting time since the data reception continuation/suspension determining section determines the suspension of data reception until restart of the data reception, the waiting-time calculating section calculating the waiting time according to the current-time resource allocation ratio.

4. The radio communication terminal according to claim 2, wherein the data reception continuation/suspension determining section determines the suspension of data reception, when the current-time resource allocation ratio exceeding the off-time resource allocation ratio is calculated, or when the calculated current-time resource allocation ratio exceeds a predetermined range based on actual results.

5. The radio communication terminal according to claim 3, wherein the waiting-time calculating section calculates a waiting time longer than the waiting time calculated according to the current-time resource allocation ratio, when the current-time resource allocation ratio exceeding the off-time resource allocation ratio is calculated, or when the calculated current-time resource allocation ratio exceeds a predetermined range based on actual results.

6. The radio communication terminal according to claim 1, wherein the link-usage level calculating section calculates the current-time resource allocation ratio based on number of time slots allocated to the radio communication terminal.

7. A radio communication terminal comprising: a link-usage level calculating section that calculates usage level of a radio link, the link-usage level calculating section calculating a current usage level indicating a level of usage of the radio link associated with current data reception in the radio communication terminal, the link-usage level calculating section calculating a current-time-zone level of usage indicating a level of usage of the radio link in the current time zone associated with data reception in the radio communication terminal based on the current usage level and another level of usage calculated in the current time zone, when the current usage level is calculated; and a data reception continuation/suspension determining section that determines continuation of data reception or suspension of data reception according to the level of usage calculated by the link-usage level calculating section, the data reception continuation/suspension determining section determining continuation of the data reception when the current-time-zone level of usage is equal to or higher than a reference level of usage being a threshold, and determining suspension of the data reception when the current-time-zone level of usage is lower than the reference level of usage.

8. The radio communication terminal according to claim 7, further comprising:
a threshold calculating section that calculates the reference level of usage based on an off-time level of usage indicating a level of usage of the radio link associated with the data reception in the radio communication terminal during off time of the radio link, the link-usage level calculating section calculating the off-time level of usage at time set as the off time.

9. The radio communication terminal according to claim 7, further comprising:
a waiting-time calculating section that calculates waiting time since the data reception continuation/suspension determining section determines the suspension of data reception until the data reception continuation/suspension determining section determines restart of the data reception, the waiting-time calculating section calculating the waiting time according to the current usage level.

10. The radio communication terminal according to claim 7, further comprising:
a waiting-time calculating section that calculates waiting time since the data reception continuation/suspension determining section determines the suspension of data reception until the data reception continuation/suspension determining section determines restart of the data reception, the waiting-time calculating section calculating the waiting time according to the current-time-zone level of usage.

11. The radio communication terminal according to claim 8, wherein the data reception continuation/suspension determining section determines the suspension of data reception, when the current usage level exceeding the off-time level of usage is calculated, or when the calculated current usage level exceeds a predetermined range based on actual results.

12. The radio communication terminal according to claim 9, wherein the waiting-time calculating section calculates a waiting time longer than the waiting time calculated according to the current usage level, when the current usage level exceeding the off-time level of usage is calculated, or when the calculated current usage level exceeds a predetermined range based on actual results.

13. The radio communication terminal according to claim 10, wherein the waiting-time calculating section calculates a waiting time longer than the waiting time calculated according to the current-time-zone level of usage, when the current usage level exceeding the off-time level of usage is calculated, or when the calculated current usage level exceeds a predetermined range based on actual results.

14. A radio communication terminal comprising: a link-usage level calculating section that adds up a number of pieces of information transmitted from a base station within a predetermined time, the information being information for limiting an uplink speed of the radio communication terminal, the link-usage level calculating section calculating an aggregate by dividing the number of the pieces of the information by maximum number of pieces of the information which the radio communication terminal receives within the predetermined time; and a data transmission continuation/suspension determining section that determines continuation of data transmission when the aggregate is less than a predetermined threshold and determines suspension of data transmission when the aggregate is equal to or more than the predetermined threshold.

* * * * *